US010624494B2

(12) United States Patent
Klassen

(10) Patent No.: US 10,624,494 B2
(45) Date of Patent: Apr. 21, 2020

(54) GRILL ASSEMBLY FOR A COOKING DEVICE AND THE APPARATUS MADE THEREWITH

(71) Applicant: Peter J. Klassen, Franklin, TN (US)

(72) Inventor: Peter J. Klassen, Franklin, TN (US)

( * ) Notice: Subject to any disclaimer, the term of this patent is extended or adjusted under 35 U.S.C. 154(b) by 350 days.

(21) Appl. No.: 15/782,076

(22) Filed: Oct. 12, 2017

(65) Prior Publication Data
US 2018/0098662 A1 Apr. 12, 2018

Related U.S. Application Data

(60) Provisional application No. 62/407,154, filed on Oct. 12, 2016.

(51) Int. Cl.
*A47J 37/07* (2006.01)
*A47J 37/06* (2006.01)

(52) U.S. Cl.
CPC ....... *A47J 37/0727* (2013.01); *A47J 37/0647* (2013.01); *A47J 37/0713* (2013.01); *A47J 37/0763* (2013.01)

(58) Field of Classification Search
CPC .. A47J 37/0713; A47J 37/0727; A47J 37/074; A47J 37/0647; A47J 37/0682
USPC ............... 99/340, 482; 126/25 R, 41 R, 39 E
See application file for complete search history.

(56) References Cited

U.S. PATENT DOCUMENTS

| | | | |
|---|---|---|---|
| 3,824,984 A | 7/1974 | Swanson et al. | |
| 4,886,045 A * | 12/1989 | Ducate, Jr. | A47J 37/0713 126/41 R |
| 5,070,857 A * | 12/1991 | Sarten | A47J 37/0704 126/25 A |
| 5,127,824 A | 7/1992 | Barker | |
| 6,543,435 B1 | 4/2003 | Regen et al. | |
| 7,703,450 B2 * | 4/2010 | Brunner | A47J 37/0713 126/25 A |
| 8,387,610 B1 * | 3/2013 | Candelaria, Jr. | B60N 3/16 126/25 R |
| 9,420,914 B2 | 8/2016 | Hamlin | |
| 9,504,354 B1 | 11/2016 | Ficarra | |
| 2007/0221193 A1 * | 9/2007 | Hsu | A47J 37/0713 126/41 R |
| 2011/0120442 A1 | 5/2011 | Duncan | |
| 2013/0152803 A1 | 6/2013 | Patton | |
| 2015/0030736 A1 | 1/2015 | Luther et al. | |
| 2016/0255998 A1 * | 9/2016 | Feng | A47J 37/0713 |

* cited by examiner

*Primary Examiner* — Reginald Alexander
(74) *Attorney, Agent, or Firm* — Marshall & Melhorn, LLC

(57) ABSTRACT

A grill assembly for a cooking device. The grill assembly includes one or more burner systems. A control unit has one or more valves for controlling a flow of fuel to the one or more burner systems. A body is attached to the control unit. The body includes an upper frame member and a lower frame member. The upper frame member and the lower frame member are removable from the cooking device.

12 Claims, 7 Drawing Sheets

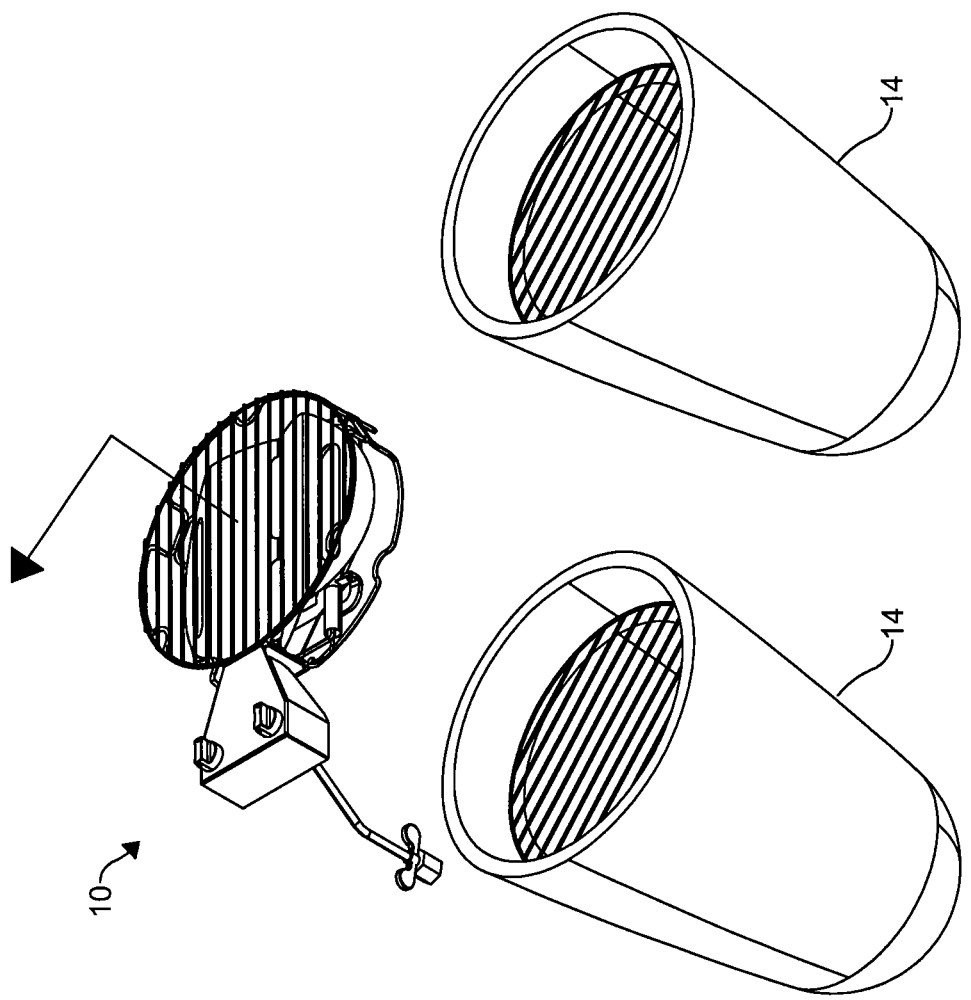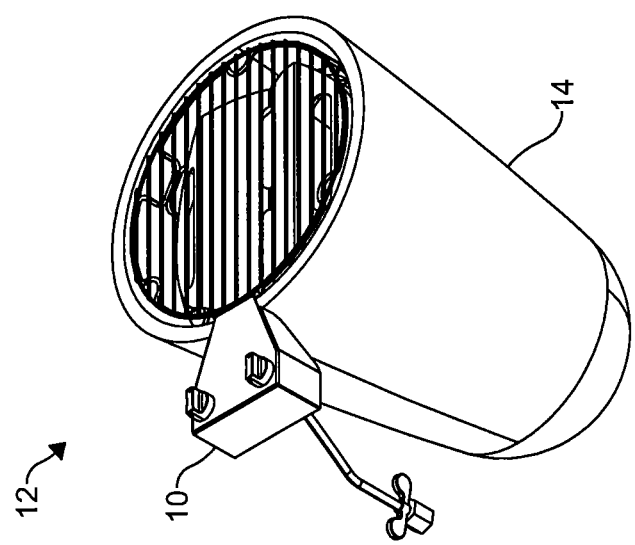

GRILL ASSEMBLY FOR A COOKING DEVICE AND THE APPARATUS MADE THEREWITH

CROSS-REFERENCE TO RELATED APPLICATION

This application is claiming the benefit, under 35 U.S.C. 119(e), of the provisional U.S. patent application which was granted Ser. No. 62/407,154 and filed on Oct. 12, 2016, the entire disclosure of which is hereby incorporated by reference.

BACKGROUND OF THE INVENTION

The invention relates to a grill assembly for a cooking device and the apparatus made therewith.

Cooking devices such as, for example, food smokers are a popular option for cooking a variety of food items. However, some cooking devices are limited by the amount of time it takes to load the fuel into the device and light, stabilize, and maintain a fire therein. Consequently, owners of such devices often are forced to own a traditional gas grill for situations that require a quicker and more convenient cooking experience. This means that many of said owners are also storing and maintaining a gas grill.

Thus, there is a need in the art for a solution that overcomes the above-described disadvantages.

BRIEF SUMMARY OF THE INVENTION

Embodiments of a grill assembly for a cooking device are provided. In an embodiment, the grill assembly comprises one or more burner systems. The grill assembly also comprises a control unit having one or more valves for controlling a flow of fuel to the one or more burner systems. A body is attached to the control unit. The body comprises an upper frame member and a lower frame member. The upper frame member and the lower frame member are removable from the cooking device.

In another embodiment, the grill assembly comprises one or more burner systems. The grill assembly also comprises a control unit having one or more valves for controlling a flow of fuel to the one or more burner systems. A body is attached to the control unit. The body comprises an upper frame member and a lower frame member. The upper frame member and the lower frame member are removable from a food smoker.

Embodiments of an apparatus are also provided. In an embodiment, the apparatus comprises a cooking device. The cooking device comprises an inner flange. A grill assembly is connected to the cooking device. The grill assembly comprises one or more burner systems, a control unit having one or more valves for controlling a flow of fuel to the one or more burner systems, and a body comprising an upper frame member and a lower frame member. A grill grate is disposed on the upper frame member and the lower frame member is disposed on the inner flange.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which:

FIG. 8A is a partial perspective view of an apparatus in accordance with the invention which illustrates an embodiment of the grill assembly connected to an embodiment of a cooking device;

FIG. 8B is a perspective view of the apparatus of FIG. 8A which illustrates the grill assembly being removed from the cooking device; and FIG. 8C is a perspective view of the cooking device of FIG. 8A after the grill assembly has been removed.

DETAILED DESCRIPTION OF THE INVENTION

It is to be understood that the invention may assume various alternative orientations and step sequences, except where expressly specified to the contrary. It is also to be understood that the specific assemblies, apparatuses, and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements found in the aforementioned embodiments may be referred to with like identifiers within this section of the application.

Embodiments of a grill assembly 10 for a cooking device and the apparatus 12 made therewith are described herein and are illustrated in FIGS. 1-7 and 8A-8C. Advantageously, the grill assembly 10 is easy to install, easy to operate, compact and convenient to store, and eliminates the need for a traditional gas grill. Other advantages of the grill assembly 10 and apparatus made therewith will be described below and are illustrated in FIGS. 1-7 and 8A-8C.

Figure 1:
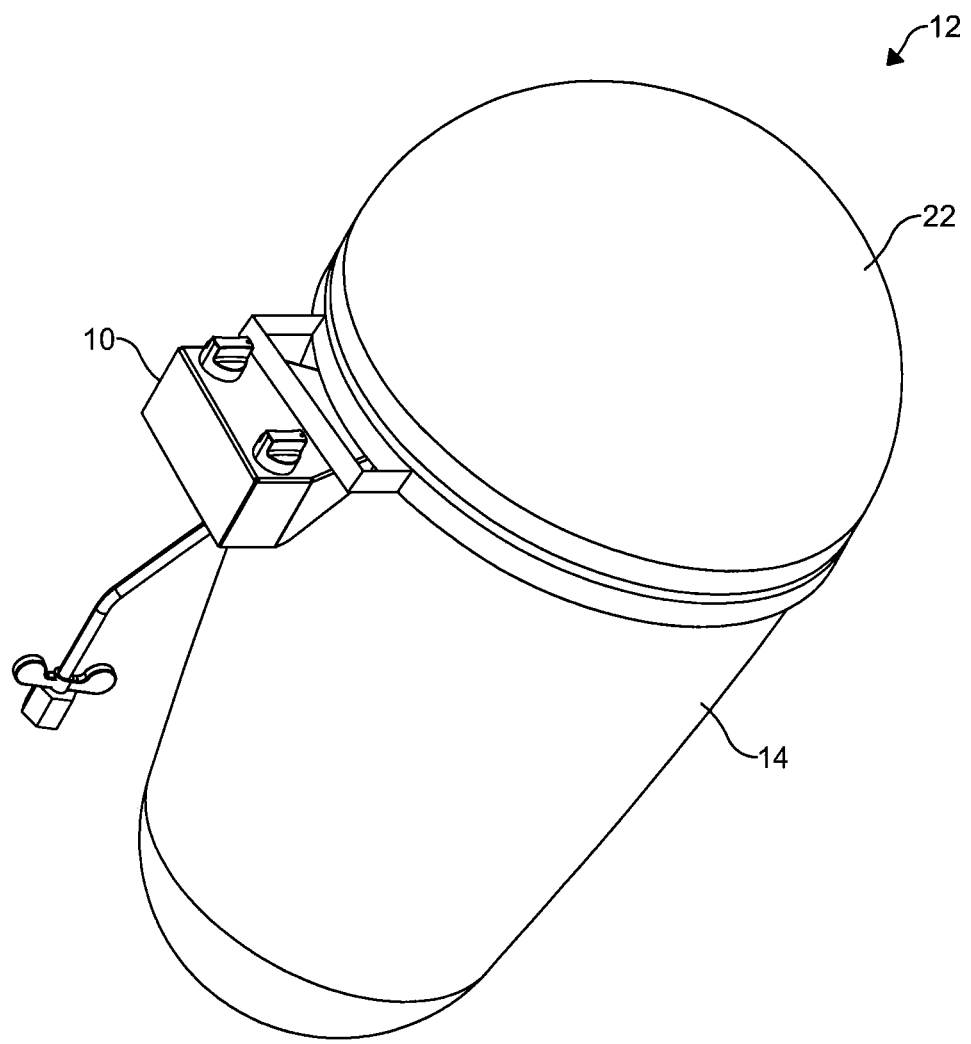
FIG. 1 is a perspective view of an embodiment of an apparatus in accordance with the invention.
Figure 2:
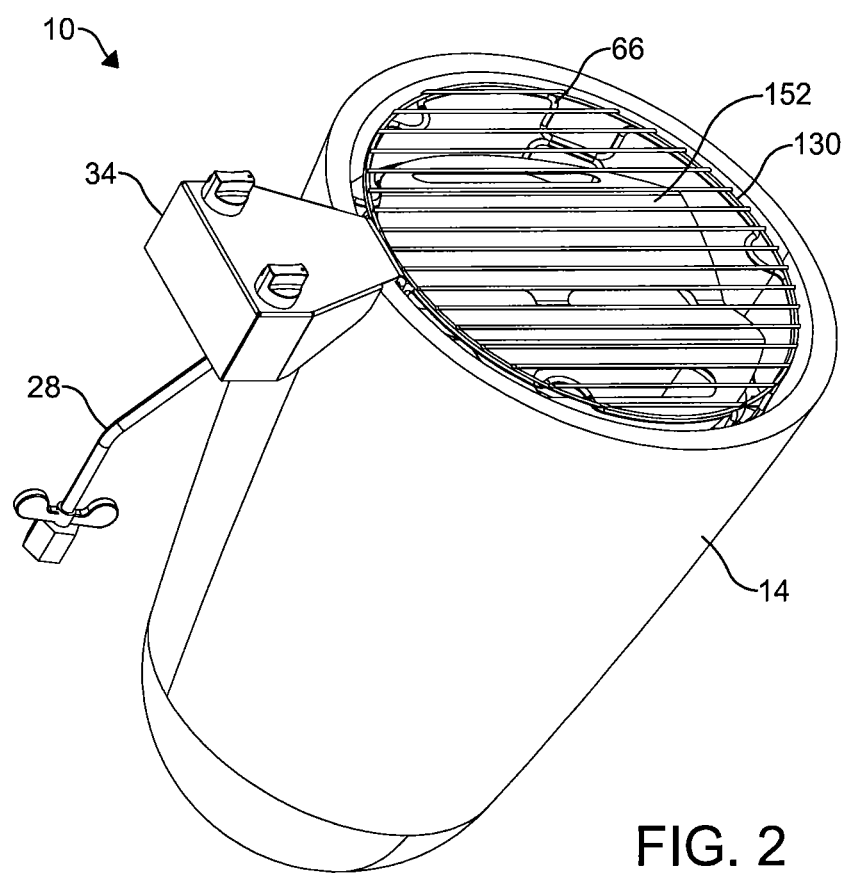
FIG. 2 is a perspective view of the apparatus of FIG. 1 with the lid removed.

When in use, the grill assembly 10 is preferably connected to a cooking device 14 as is illustrated in FIGS. 1-2 and 8A. Advantageously, the grill assembly 10 does not need to be permanently connected or secured to the cooking device 14 when in use. In these embodiments, it is preferred that prior to connecting the grill assembly 10 thereto, the cooking device 14 does not include certain elements necessary for providing a gas flame for cooking such as, for example, a gas flame burner system. Preferably, the cooking device 14 is a food smoker. Food smokers suitable for use with the grill assembly include the Big Green Egg®, Kamado Joe®, and Primo®. However, the grill assembly described herein may also be utilized with other smokers. Additionally, the grill assembly may be connected to other cooking devices. For example, in certain embodiments, the grill assembly may be utilized with and connected to a direct-heat charcoal style grill. Suitable embodiments of charcoal style grills that can be utilized as a cooking device and connected to the grill assembly 10 include charcoal style grills sold under the trademark Weber® by Weber-Stephen Products LLC.

When the cooking device 14 is a food smoker, it is preferred that the food smoker is of the ceramic variety. Referring now to FIGS. 1-4, in certain embodiments, the food smoker comprises a firebox 16. The firebox 16 is provided within the food smoker. The firebox 16 comprises an open end 18 and a closed end 20. A removable or hinged lid 22, which is illustrated in FIG. 1, may be provided to enclose the open end 18. Charcoal, wood chips, or another solid fuel may be disposed near the closed end 20 to generate heat and smoke for cooking. The firebox 16 may be of a generally cylindrical shape and may also comprise one or more wall portions 24. A flange 26 is provided within the firebox 16 near the open end 18 thereof. Preferably, the inner flange 26 is annular. In an embodiment, when the grill assembly 10 is connected to the cooking device 14, a portion of the grill assembly 10 is disposed on and over the inner flange 26. In another embodiment, after the grill assembly 10 has been utilized, if it is desired to clean and/or store the grill assembly 10, the grill assembly 10 can be disconnected from the cooking device 14 as is illustrated in FIG. 8B.

Referring back to FIGS. 1-4, the grill assembly 10 is connected to the cooking device 14 in such a way that the resulting apparatus 12 is able to utilize a gaseous fuel for cooking food and cook the food by grilling. Preferably, the grill assembly 10 is configured so that the apparatus 12 can utilize propane. Alternatively, the grill assembly may be configured so that the apparatus can utilize other gaseous fuels such as, for example, butane, methane, or another combustible gas. The gaseous fuel is provided by a source of fuel (not depicted).

The source of fuel may comprise a refillable container and a fuel in a liquid or gaseous state. The refillable container stores the fuel until it is utilized for cooking. The refillable container may be portable. On a first end, a fuel supply conduit 28 may be attached to and in fluid communication with the source of fuel. Preferably, fluid communication between the fuel supply conduit 28 and the source of fuel is provided via a valve located in an opening of the container.

The fuel supply conduit 28 may comprise a flexible hose 30. The flexible hose 30 may include a quick connect 32 on an end thereof. The quick connect 32 is provided so that the source of fuel can be easily separated from the grill assembly 10 when not in use or when the source of fuel needs to be refilled. From the source of fuel, the fuel supply conduit 28 extends in a generally vertical direction toward a control unit 34.

When the grill assembly 10 is in use, the control unit 34 is in fluid communication with the source of fuel via the fuel supply conduit 28. The control unit 34 comprises one or more valves 36, 36A which control fuel flow from the source of fuel to other portions of the grill assembly 10. A second end of the fuel supply conduit 28 is attached to the one or more valves 36, 36A. The one or more valves 36, 36A are in fluid communication with the source of fuel via the fuel supply conduit 28.

Preferably, the control unit 34 comprises two valves 36, 36A. Thus, the grill assembly 10 will be described below with reference to control unit 34 having two valves 36, 36A. However, it should be appreciated that, in certain embodiments (not depicted), the control unit may comprise a single valve or more than two valves. When the control unit 34 comprises two valves 36, 36A, a tee 38 may be provided in the fuel supply conduit 28 to direct a flow of fuel to each valve 36, 36A. Preferably, each valve 36, 36A controls a flow of fuel to a burner system 40, 40A in fluid communication with the valve 36, 36A. Each valve 36, 36A is in fluid communication with a burner system 40, 40A via a burner system conduit 42, 42A. Each burner system conduit 42, 42A extends from the valve 36, 36A it is in fluid communication with to one or more burners 44, 44A of the burner system 40, 40A. In an embodiment, a first valve 36 is in fluid communication with a first burner system 40 via a first burner system conduit 42 and a second valve 36A is in fluid communication with a second burner system 40A via a second burner system conduit 42A.

The control unit 34 also comprises a cover 46. The cover 46 is utilized to protect a support member 48, the valves 36, 36A, and portions of the burner systems 40, 40A from damage. For example, the cover 46 may be disposed over a portion of one or more burner system conduits 42, 42A. More particularly, in an embodiment, the cover 46 separates a covered portion of the one or more burner system conduits 42, 42A from the lid 22 of the cooking device 14. When the cooking device 14 is a food smoker, the cover 46 provides protection to the one or more burner system conduits 42, 42A at the location where they extend over an outer edge 50 of the food smoker. This configuration prevents the conduits 42, 42A from being crushed or damaged by the lid 22 when it is closed.

In order to provide a seal between the lid and the cover when the lid is closed, in certain embodiments (not depicted), one or more gasket members can be attached to the cover or another portion of the control unit. When the cooking device is a food smoker, the one more gasket members may be provided to seal a gap between the control unit and the outer edge of the food smoker. In an embodiment, the one or more gasket members can be made of felt and wedge-shaped. In this embodiment, the felt gasket members can held in place by one or more metal clips.

Figure 4:
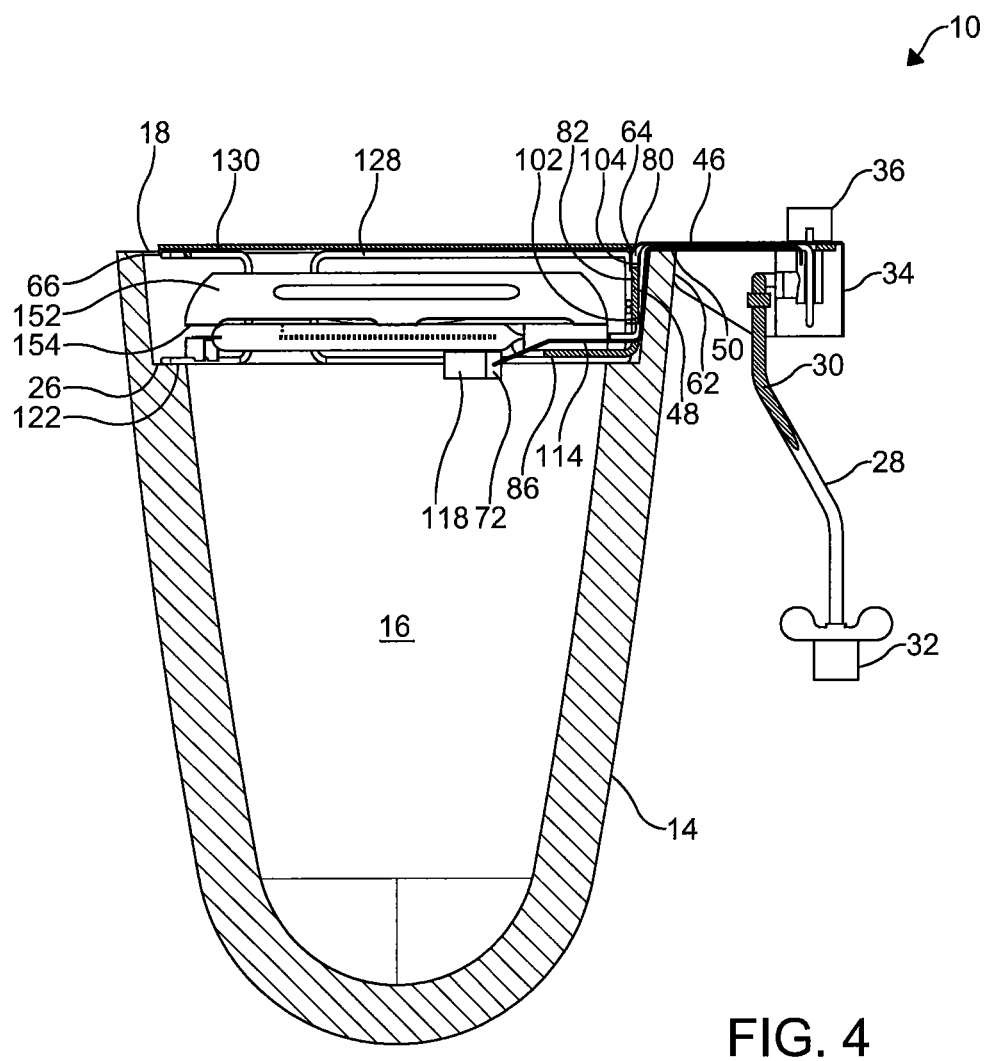
FIG. 4 is a cross-sectional view of the apparatus of FIG. 2.

Preferably, the cover 46 is constructed of rigid material such as, for example, a cast aluminum. However, it should be appreciated that the cover could be formed from additional or alternative wear resistant materials. The cover 46 comprises an upper wall 52 and one or more sidewalls 54. The one or more sidewalls 54 are attached to the upper wall 52 and extend in a direction away from an outer surface 58 of the upper wall 52. The cover 46 also has an open end 60 which, when the grill assembly 10 is connected to a cooking device 14, abuts an outer surface 62 of, for example, the food smoker, which is illustrated in FIG. 4. The upper wall 52 is disposed over a first portion of the support member 48 and is attached to curved extension 64. In an embodiment, the upper wall 52 and curved extension 64 may be formed in a unitary manner. When the grill assembly 10 is connected to a food smoker, the curved extension 64 extends over the outer edge 50 of the food smoker and into the firebox 16.

Preferably, the support member 48 is constructed of a rigid material such as, for example, cast aluminum. However, it should be appreciated that the support member could be formed from additional or alternative wear resistant materials. The support member 48 enables the valves 36, 36A, conduits 42, 42A, burner systems 44, 44A, and a grill body 66 to maintain their positions with respect to each other.

A first portion 68 of the support member 48 is disposed within the cover 46. The first portion 68 of the support member 46 may be generally T-shaped and have an elongated aperture 70 formed therein. A portion of the first burner system conduit 42 and a portion of the second burner system conduit 42A may be disposed within the aperture 70. Portions of an ignition system 72 may also be disposed within the aperture 70.

Preferably, each valve 36, 36A is attached to the support member 48 near a first end thereof. Each valve 36, 36A comprises a valve body 74, 74A. In an embodiment, each valve body 74, 74A is disposed through a hole 76, 76A provided in the first portion 68 of the support member 48. In this embodiment, the holes 76, 76A may be provided on opposite sides of the first portion. Each valve 36, 36A also comprises a handle 78, 78A for adjusting the valve. Preferably, the handle 78, 78A is provided on an end of the valve 36, 36A and is disposed over the upper wall 52 of the cover 46.

The first portion 68 extends in a direction toward the grill body 66. At a second end of the first portion 68, the first portion 68 may be attached to a curved transition portion 80. The aperture 70 extends from the first portion 68 through a first section of the curved transition portion 80. When the grill assembly 10 is connected to a food smoker, the curved transition portion 80 extends over the outer edge 50 of the food smoker and into the firebox 16.

The curved transition portion 80 is attached to a second portion 82 at a first end thereof. The second portion 82 is provided in a perpendicular relationship with the first portion 68. However, other orientations are permissible. As is illustrated best in FIG. 4, when the grill assembly 10 is connected to a food smoker, the second portion 82 extends vertically in a direction away from the open end 18 of the firebox 16. In one such embodiment, the second portion 82 extends toward the inner flange 26. As illustrated best in FIG. 3, a hole 84 is provided adjacent a second end of the second portion 82. Referring back to FIG. 4, a portion of the first burner system conduit 42 and a portion of the second burner system conduit 42A may be disposed through the hole 84. Portions of the ignition system 72 may also be disposed through the hole 84. From the hole 84, the first burner system conduit 42 extends to a first burner 44 to communicate therewith. Similarly, from the hole 84, the second burner system conduit 42A extends to a second burner 44 to communicate therewith.

At the second end thereof, the second portion 82 is attached to a third portion 86 of the support member 48. The third portion 86 is provided in a parallel relationship with the first portion 68 and a perpendicular relationship with the second portion 82. However, other orientations are permissible. The third portion 86 comprises a base 88 and separate arm members 90, 92 attached to opposite sides of the base 88. As illustrated best in FIGS. 5-6, a portion of a burner system is disposed over each arm member 90, 92. Each arm member 90, 92 is connected to and supports the burner system 40, 40A that is disposed over it. Preferably, each arm member 90, 92 comprises a flange 94, 96 provided at the end of each arm member 90, 92. It is preferred that each arm member flange 94, 96 is connected to a corresponding flange 98, 100 provided on each burner system 40, 40A. The arm member flanges 94, 96 and the corresponding burner system flanges 98, 100 may be attached to each other via a fastener or another member.

Referring now to FIGS. 3-7, the burner systems 40, 40A are designed to optimize the grilling space within the cooking device 14. Preferably, each burner system 40, 40A is designed to receive a mixture of air and propane or another gaseous fuel. The grill assembly 10 will be described below with reference to two burner systems 40, 40A. However, it should be appreciated that, in certain embodiments, the grill assembly may comprise a single burner system or more than two burner systems.

Each burner system 40, 40A comprises a burner system conduit 42, 42A. Each burner system conduit 42, 42A directs the air/fuel mixture to one or more burners 44, 44A. Each burner system conduit 42, 42a may comprise a narrowed portion. The narrowed portions of the burner system conduits allow the air/fuel mixture to gain speed as it is directed to the burners and provides the ability to draw in air outside of the cooking device.

The grill assembly 10 will be described below with reference to two burner system conduits 42, 42A. However, it should be appreciated that, in certain embodiments, the grill assembly may comprise a single burner system conduit or more than two burner system conduits. On an end, the first burner system conduit 42 is provided in fluid communication with the first valve 36 and, on an opposite end, the first burner system conduit 42 is provided in fluid communication with one or more burners 44 of the first burner system 40. The first burner system conduit 42 directs the flow of fuel from the first valve 36 to the one or more burners 44. Similarly, on an end, the second burner system conduit 42A is provided is in fluid communication with the second valve 36A and, on an opposite end, the second burner system conduit 42A is provided in fluid communication with one or more burners 44A of the second burner system 40A. The second burner system conduit 42A directs the flow of fuel from the second valve 36A to the one or more burners 44A.

In the embodiments illustrated, the first burner system conduit 42 and the second burner system conduit 42A are provided in a spaced apart and parallel relationship with each other. The first burner system conduit 42 and the second burner system conduit 42A each extend from control unit 34 to the grill body 66. When the grill assembly 10 is connect to a food smoker, the burner system conduits 42, 42A extend in the aperture 70 toward the food smoker and over the outer edge 50 of the food smoker into the firebox 16. As illustrated in FIG. 4, within the firebox 16, the burner system conduits 42, 42A extend between an inner surface of the firebox 16 and the second portion 82 of the support member 48. Preferably, the burner system conduits 42, 42A extend along and in a parallel relationship with a first surface 104 of the second portion 82. Also, as mentioned above, the burner system conduits 42, 42A extend through the hole 84 in the second portion 82. From the hole 84, the first burner system conduit 42 extends to the one or more burners 44 of the first burner system 40 to communicate therewith. Similarly, from the hole 84, the second burner system conduit 42A extends to the one or more burners 44A of the second burner system 40A to communicate therewith.

Each burner system 40, 40A comprises the one or more burners 44, 44A as described above. Preferably, each burner 44, 44A is metallic. In certain embodiments, the one or more burners 44, 44A may be of the tube variety. In other embodiments, one or more of the burners may be of the one-piece variety. Preferably, when the grill assembly 10 is connected to a food smoker, the one or more burners 44, 44A of each burner system 40, 40A are positioned within an upper portion of the firebox 16. Also, in an embodiment, each burner 44, 44A may face upward or toward the open end of the firebox 16. In this embodiment, the burner is provided with openings that face the open end of the firebox. However, other burner configurations are suitable for use with the grill assembly. For example, in other embodiments, one or more of the one or more burners may be side facing. In these embodiments, when the grill assembly is connected to a food smoker, the side facing burners have openings which face the inner surface of the firebox.

In certain embodiments (not depicted), the grill assembly may also comprise a downward facing burner. The downward facing burner may also be referred to herein as a "torch." The torch is utilized to create a hybrid gas flame/charcoal smoking grilling environment. When the grill assembly is connected to a food smoker, the torch faces the closed end of the firebox. Typically, the firebox of a food smoker will contain charcoal pieces that are leftover from a prior cook. As the torch faces downward, it can be utilized to provide a flame that ignites the leftover charcoal and generates a desired amount of natural smoke in the grill. Preferably, the torch applies a controlled flame for a short period of time to the charcoal. It should be appreciated that, in certain embodiments, the torch could be utilized as charcoal ignition system. In one such embodiment, the torch could be utilized to start a fire in a firebox fully loaded with charcoal or another solid fuel. After the fire has been started, the torch could be extinguished by closing the appropriate valve at the control unit so that normal smoking/cooking could occur inside of the smoker grill. It should be appreciated that in these embodiments, the burner systems are not utilized for cooking.

Figure 7:
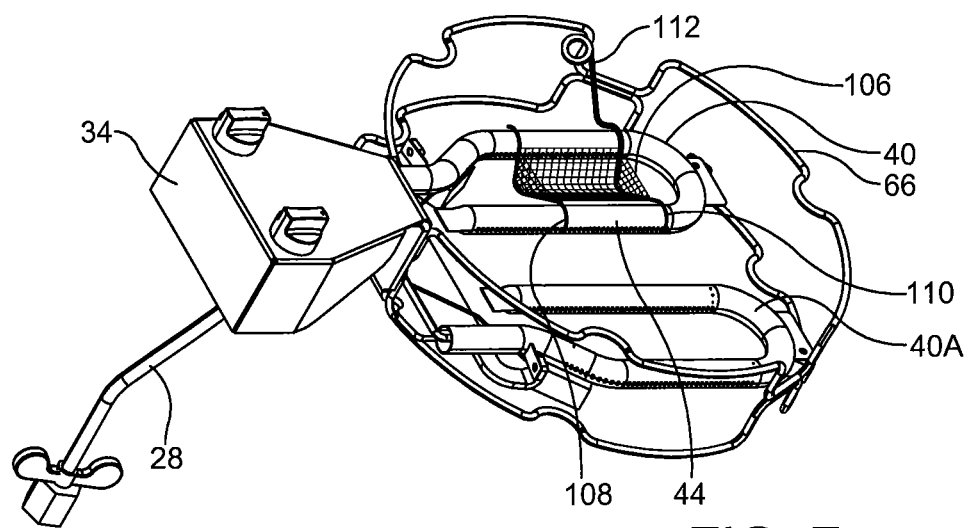
FIG. 7 is a perspective view of another embodiment of the grill assembly of FIG. 5.

In other embodiments, like the one illustrated in FIG. 7, the grill assembly 10 may comprise a container 106. The container 106 is configured and can be utilized to hold a solid fuel (not depicted) such as, for example, charcoal pieces which are new or leftover from a previous cook. As illustrated, the container 106 is positioned adjacent a burner system 40. Preferably, the container 106 is disposed over a burner 44 of the burner system 40. The container 106 may comprise a plurality of openings which allow the flame from the burner 44 to heat or ignite the charcoal in the container. In this embodiment, when the burner system 40 is utilized to ignite the charcoal, the flame may penetrate the container via the openings provided therein. In an embodiment, the container 106 comprises a wire mesh. The container 106 may also comprise one or more legs 108, 110 for securing the position of the container relative to the burner system 40. In an embodiment, the container 106 comprises two legs 108, 110 and the legs are provided on opposite ends of the container. In this embodiment, the legs 108, 110 may be disposed over a burner 44 for positioning the container adjacent the burner system 40. The container may also comprise a handle 112 for adjusting the position of the container 106 relative to the burner 44. The handle 112 may be attached to one of the legs 110 or another portion of the container 106. Thus, in the embodiments described above, the grill assembly 10, and apparatus 12 made therewith, provides a cooking experience with the convenience, speed, and the precision of a gas flame and with the flavors produced by natural smoke.

Referring back to FIGS. 3-4 and 5-6, in certain embodiments, the grill assembly 10 may also comprise the ignition system 72. The ignition system 72 is utilized to allow the grill assembly 10 to easily produce a flame for cooking. In an embodiment, the ignition system is of the automatic variety. When the ignition system is of the automatic variety, a spark is administered at the very moment that one of the valves are opened, ultimately igniting the corresponding burner(s) without the aid of a match or button style electronic ignition system. In another embodiment, the ignition system is of the electric variety. In this embodiment, the ignition system 72 may comprise one or more ignition buttons. The ignition system may also comprise one or more electric wires 114, 116. Preferably, as is illustrated best in FIGS. 4 and 6, each electric wire 114, 116 extends from the control unit 34 to an area adjacent a burner 44, 44A where it is connected to an ignitor 118, 120. As illustrated, the grill assembly 10 may comprise two ignitors 118, 120. As illustrated best in FIG. 6, each ignitor 118, 120 is provided adjacent a burner 44, 44A and utilized to ignite the flow of fuel that is discharged from the burner system 40, 40A.

Figure 5:
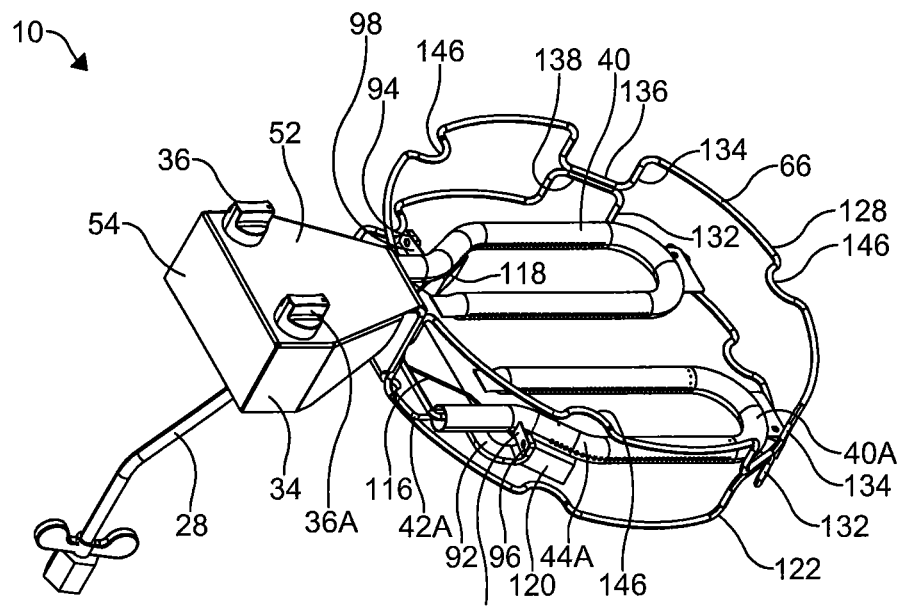
FIG. 5 is a top perspective view of an embodiment of a grill assembly in accordance with the invention.
Figure 6:
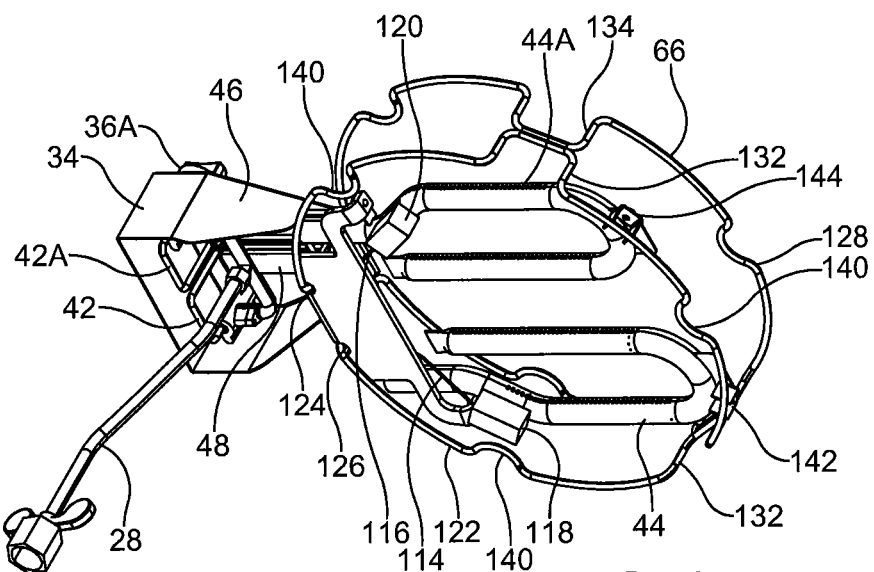
FIG. 6 is a bottom perspective view of the grill assembly of FIG. 5.

As illustrated best in FIGS. 5-7, the control unit 34 is attached to the grill body 66. Preferably, the control unit 34 is attached to the grill body 66 via an interlock between the third portion 86 of the support member 48 and a lower frame member 122 of the grill body 66. More particularly, as illustrated best in FIG. 6, the third portion 86 comprises a pair of removed portions 124, 126. To form the interlock, each removed portion 124, 126 receives a portion of the lower frame member 122 which attaches the control unit 34 to the grill body 66.

When connecting the grill assembly 10 to the cooking device 14, one or more portions of the grill assembly are received within the device. When the cooking device 14 is a food smoker, it is preferred that the grill body 66 is received in the food smoker. In this embodiment, the grill body 66 is configured so that it can be positioned within or removed from the food smoker quickly and easily. For example, as noted above, the grill assembly 10 does not need to be permanently connected or secured to the cooking device 14 in order to transform the cooking device into a gas powered flame burner style grill apparatus. Thus, the configuration of the grill body 66 allows the grill assembly 10 to rapidly transform a cooking device 14 such as, for example, a food smoker into a gas powered flame burner style grill apparatus or vice versa which is illustrated in FIGS. 8A-8C.

In an embodiment, the grill body 66 comprises the lower frame member 122 and an upper frame member 128. When it is desired to transform a cooking device 14 into a gas powered flame burner grill apparatus 12 like the one illustrated in FIGS. 1-2 and 8A, the lower frame member 122 and upper frame member 128 are positioned in the cooking device 14. Preferably, in this embodiment, the lower frame member 122 and upper frame member 128 are positioned in the firebox 16. When it is desired to transform the gas powered flame burner grill apparatus 12 back into a solid fuel cooking device 14, like the one illustrated in FIG. 8C, the lower frame member 122 and the upper frame member 128 are removed from the cooking device 14, which is illustrated in FIG. 8B, without having to adjust or disconnect any fasteners or another device for connecting or securing the grill assembly to cooking device 14.

In an embodiment, the lower frame member 122 and the upper frame member 128 each comprise a wire member. Utilizing a first wire member to form the upper frame member 128 and a second wire member to form the lower frame member 122 reduces the weight of the body 66 and the grill assembly 10. Preferably, each wire member is formed from a rigid material such as, for example, metal. However, the upper frame member and the lower frame member may be formed from other rigid materials.

Preferably, the lower frame member 122 and the upper frame member 128 are in a parallel relationship with each other. As is depicted in the illustrated embodiments, portions of the lower frame member 122 and portions of the upper frame member 128 are spaced apart from each other and other portions of the lower frame member 122 and other portions of the upper frame member 128 abut each other. In an embodiment, the lower frame member 122 and the upper frame member 128 each extend in a circumferential direction. In this embodiment, the lower frame member 122 and the upper frame member 128 may each be annular. In another embodiment, the one or more burners 44 of the first burner system 40 and the one or more burners 44A of the second burner system 40A are provided within a perimeter defined by the lower frame member 122 and the upper frame member 128. In this embodiment, the perimeter may be annular.

The lower frame member 122 is connected to the upper frame member 128. The frame members 122, 128 are connected to each other so that when the grill assembly 10 is in use the body 66 can be fit within the cooking device 14 and support a grill grate 130 disposed on the upper frame member 128. In certain embodiments, the lower frame member 122 comprises a plurality of ridges 132 and the upper frame member 128 comprises a plurality of grooves 134. In one such embodiment, each upper frame member groove 134 is aligned with a corresponding lower frame member ridge 132. Preferably, when an upper frame member groove 134 is aligned with a lower frame member ridge 132, at least a portion of the upper frame member 128 defining the groove 134 and at least a portion of the lower frame member 122 defining the ridge 132 are in contact. More particularly, circumferentially extending portions 136 of the upper frame member 128 defining the grooves 134 and circumferentially extending portions 138 of the lower frame member 122 defining the ridges 132 abut each other. Contact between the lower frame member 122 and the upper frame member 128 helps to maintain the position of the frame members relative to each other. In other embodiments (not depicted), the position of the upper frame member relative to the lower frame member may be maintained by providing support members between the upper frame member and the lower frame member.

When the grill body 66 is positioned within the cooking device 14, the configuration of the grill body and gravity hold the grill assembly securely in place within the device. More particularly, when the grill assembly 10 is connected to a food smoker, it is preferred that the lower frame member 122 is disposed on the inner flange 26 provided within the firebox 16 as is illustrated best in FIG. 4. The lower frame member 122 may comprise one or more stabilizing members 140. As illustrated best in FIG. 6, the lower frame member 122 may comprise three stabilizing members 140. The one or more stabilizing members 140 are utilized to help maintain the position of the lower frame member 122 relative to, for example, the inner flange 26. Preferably, each stabilizing member 140 is disposed around the perimeter of the lower frame member 122 and extends radially toward a center of the grill body 66. In certain embodiments, each stabilizing member 140 may be of a semicircular shape. However, it should be appreciated that the one or more stabilizing members may be of another shape. When the grill assembly 10 is not in use and has been removed from the cooking device 14, the stabilizing members 140 allow the assembly 10 to be stored on a flat surface, which helps protect the burners and torch (when provided) from being damaged.

The lower frame member 122 may also be utilized to help maintain the position of the burner systems 40, 40A with respect to each other and the grill body 66. For example, in certain embodiments, the lower frame member 122 is connected to and supports one or more of the burner systems 40, 40A via one or more brackets 142, 144. The one or more brackets 142, 144 are each attached to the lower frame member 122 and to a burner system 40, 40A. More particularly, each bracket 142, 144 is attached to a burner 44, 44A. As illustrated best in FIG. 6, two brackets 142, 144 may be attached to the lower frame member 122 and each bracket 142, 144 is attached to a separate burner 44, 44A. In these embodiments, it is preferred that each bracket 142, 144 is attached to an end of burner 44, 44A it is attached to. On or more additional brackets (not depicted) may be provided to enable the lower frame member to help maintain the position of the burner systems.

As illustrated best in FIG. 4, when the grill assembly 10 is connected to a cooking device 14 like a food smoker such that the grill body 66 is positioned within the firebox 16, the upper frame member 128 is provided at or near the open end 18 thereof. The upper frame member 128 may comprise one or more support members 146. As illustrated best in FIG. 5, the upper frame member 128 may comprise three support members 146. Preferably, each support member 146 is disposed around the perimeter of the upper frame member 128 and extends radially toward a center of the grill body 66. In certain embodiments, each support member 146 may be of a semicircular shape. Each support member 146 may be aligned with a corresponding stabilizing member 140. In this embodiment, each support member 146 is provided in a parallel and spaced apart relationship with the corresponding stabilizing member 140. The one or more support members 146 are utilized to help maintain the position of the grill grate 130.

The grill grate 130 is utilized to support food disposed thereon during grilling or smoking. The grill grate may be of a conventional configuration known in the art. As illustrated best in FIG. 3, the grill grate 130 has a circular frame 148 attached to a plurality of elongated members 150. The elongated members 150 are provided in a spaced apart and parallel relationship with each other. A space is provided on both sides of each elongated member 150 to allow heat from the burner systems 40, 40A to pass through the grate 130 to any food disposed thereon. When in use, the grill grate 130 is disposed on the upper frame member 128.

Figure 3:
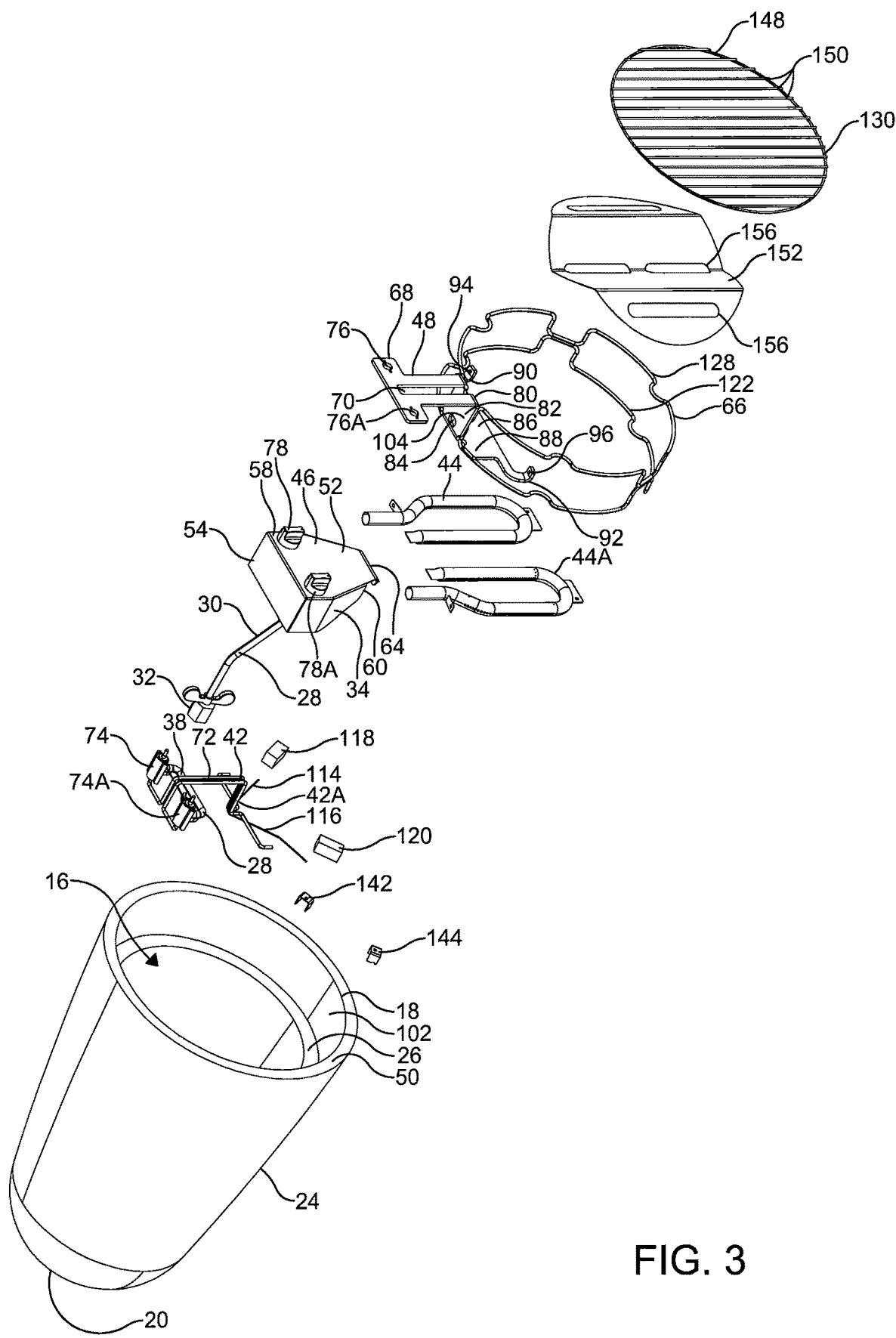
FIG. 3 is an exploded view of the apparatus of FIG. 2.

In certain embodiments like the ones illustrated in FIGS. 2-4, the grill assembly 10 may comprise a flame tent 152. The flame tent 152 is designed to optimize the grilling capability of the one or more burner systems. Also, the flame tent 152 protects the burners 44, 44A from food drippings and protects the food disposed on the grill grate 130 from flame sear. In order to prevent food sear and block a fame from contacting any food disposed on the grill grate 130, the flame tent 152 is provided within the perimeter defined by the lower frame member 122 and the upper frame member 128 is positioned between and separates one or more of the burners 44, 44A and the grill grate 130. Because of the high temperatures and drippings that the flame tent 152 is exposed to, it is preferred that the flame tent 152 is formed from a corrosion resistant metal.

As is illustrated best in FIG. 4, when the grill assembly 10 is connected to a cooking device 14, it is preferred that the flame tent 152 is disposed on and over the one or more burner systems 40, 40A such that a lower surface 154 of the flame tent 152 is provided over one or more burners 44, 44A. It is preferred that gravity holds the flame tent 152 firmly in place over the one or more burners 44, 44A. However, in certain embodiments (not depicted), the flame tent can be secured to the one or more burner systems by one or more fasteners. The flame tent can be set on and lifted off of the one or more burner systems by utilizing a handle (not depicted) attached thereto. The handle can be attached to the flame tent via welding or another method.

In certain embodiments, like the one illustrated in FIG. 3, the flame tent 152 is a corrugated member. In these embodiments, the flame tent 152 may comprise one or more openings 156 to direct heat generated by the one or more burner systems 40, 40A to the grill grate 130 and any food disposed thereon. Each opening 156 may be curvilinear. In one such embodiment, the one or more openings 156 may be generally ovular in shape. For example, as illustrated in FIG. 3, the one or more openings 156 may each be of an elongated ovular shape. However, the one or more openings may be of another shape. For example, in an embodiment (not depicted), the one or more openings may be of a rounded rectangular shape of another shape. In other embodiments (not depicted), the flame tent includes one or more L-shaped members. Each L-shaped member may be formed from a corrosion resistant metal. The L-shaped members are connected by welds to a welded wire body.

Additionally, in certain embodiments (not depicted), the grill assembly can include a temperature gauge. Preferably, the temperature gauge is attached to a wire probe, which can measure the temperature at the grill grate or can be inserted into whatever is being cooked to measure the internal temperature thereof. In an embodiment, the temperature gauge may be of the electronic variety and include a timer.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. An apparatus, comprising:
 a cooking device comprising an inner flange; and
 a grill assembly connected to the cooking device, the grill assembly comprising one or more burner systems, a control unit having one or more valves for controlling a flow of fuel to the one or more burner systems, and a body comprising an upper frame member and a lower frame member, wherein a grill grate is disposed on the upper frame member and the lower frame member is disposed on the inner flange;
 a flame tent, the flame tent separating one or more burners of the one or more burner systems from the grill grate; and
 a container disposed over the one or more burners, the container including a plurality of openings and configured to hold a solid fuel.

2. The grill assembly of claim 1, wherein the body is connected to the one or more burner systems via one or more brackets.

3. The grill assembly of claim 1, wherein the upper frame member and the lower frame member are in a parallel relationship.

4. The grill assembly of claim 1, wherein the upper frame member and the lower frame member each comprise a wire member.

5. The grill assembly of claim 1, further comprising a conduit for directing the flow of fuel from the one or more valves to the one or more burner systems, wherein the conduit extends from the control unit to the body and is fluid communication with one or more burners.

6. The grill assembly of claim 1, wherein the one or more burner systems comprise a first burner system and a second burner system.

7. The grill assembly of claim 1, wherein the upper frame member and the lower frame member each extend in a circumferential direction.

8. The grill assembly of claim 1, further comprising a fuel supply conduit in fluid communication with the one or more valves.

9. The grill assembly of claim 5, wherein the conduit extends over an edge of the cooking device and into a firebox provided within the cooking device.

10. The grill assembly of claim 7, wherein the upper frame member and the lower frame member are each annular and provided in a parallel relationship with each other.

11. The grill assembly of claim 1, wherein the flame tent is corrugated.

12. The apparatus of claim 1, wherein the cooking device is a food smoker and the grill assembly is removable from the food smoker.

* * * * *